United States Patent
Paulwitz et al.

(10) Patent No.: US 7,362,162 B2
(45) Date of Patent: Apr. 22, 2008

(54) LINE FILTER

(75) Inventors: Christian Paulwitz, Pettenberg (DE); Manfred Karasek, Steinheim (DE)

(73) Assignee: EPCOS AG, Munich (DE)

(*) Notice: Subject to any disclaimer, the term of this patent is extended or adjusted under 35 U.S.C. 154(b) by 0 days.

(21) Appl. No.: 10/332,911

(22) PCT Filed: Jul. 11, 2001

(86) PCT No.: PCT/DE01/02580

§ 371 (c)(1),
(2), (4) Date: Apr. 17, 2003

(87) PCT Pub. No.: WO02/07293

PCT Pub. Date: Jan. 24, 2002

(65) Prior Publication Data
US 2003/0184410 A1 Oct. 2, 2003

(30) Foreign Application Priority Data
Jul. 13, 2000 (DE) .................. 100 34 054

(51) Int. Cl.
H03K 5/00 (2006.01)

(52) U.S. Cl. .............. 327/532; 325/551; 307/105; 333/181; 363/47

(58) Field of Classification Search ........ 333/127, 333/181, 176–177; 363/39, 40, 44, 45, 47; 327/531–532, 551, 552; 307/105
See application file for complete search history.

(56) References Cited

U.S. PATENT DOCUMENTS

| 2,241,832 | A | * | 5/1941 | Wahlquist | 307/105 |
| 3,681,612 | A | * | 8/1972 | Vogl et al. | 307/105 |
| 4,843,515 | A | * | 6/1989 | Richman | 361/58 |
| 4,967,334 | A | | 10/1990 | Cook et al. | 364/34 |
| 5,345,375 | A | | 9/1994 | Mohan | |
| 5,499,178 | A | * | 3/1996 | Mohan | 363/39 |
| 5,619,079 | A | * | 4/1997 | Wiggins et al. | 307/89 |
| 5,661,390 | A | * | 8/1997 | Lipo et al. | 318/803 |
| 5,814,901 | A | * | 9/1998 | Ihara | 307/105 |

(Continued)

FOREIGN PATENT DOCUMENTS

DE    1 927 415    1/1970

(Continued)

OTHER PUBLICATIONS

Börner, "Digitalschaltungen und Kleinrechner entstören", *Elektronik* 2/Jan. 19, 1990, pp. 98-101.

(Continued)

*Primary Examiner*—Dinh T. Le
(74) *Attorney, Agent, or Firm*—Schiff Hardin LLP

(57) ABSTRACT

The invention is directed to a network filter that comprises at least one phase input and a protective conductor in which each phase input is connected via a filter inductance to a corresponding phase output, in which the input side of each filter inductance is connected to the protective conductor via a filter capacitor, and in which an auxiliary inductance is connected between each filter capacitor and the protective conductor, permitting the inductances in the filter to be kept small, potentially realized by simply slipping a ferrite core over a conductor.

5 Claims, 3 Drawing Sheets

U.S. PATENT DOCUMENTS

| | | | |
|---|---|---|---|
| 5,999,423 A * | 12/1999 | Steinke et al. | 363/40 |
| 6,075,425 A * | 6/2000 | Gopfrich et al. | 333/181 |
| 6,166,458 A * | 12/2000 | Redburn et al. | 307/105 |
| 6,218,913 B1 * | 4/2001 | Pagenkopf | 333/181 |
| 6,452,819 B1 * | 9/2002 | Wobben | 363/40 |

FOREIGN PATENT DOCUMENTS

| | | |
|---|---|---|
| DE | 2 030 360 | 12/1971 |
| EP | 0 920 104 | 6/1999 |
| JP | 56159974 | 12/1981 |
| JP | 06233521 | 8/1994 |

OTHER PUBLICATIONS

Brotschi et al, "Störbehebung mit Netzfiltern", *Technische Rundschau*, vol. 85, No. 10, Mar. 12, 1993, pp. 62-65.

* cited by examiner

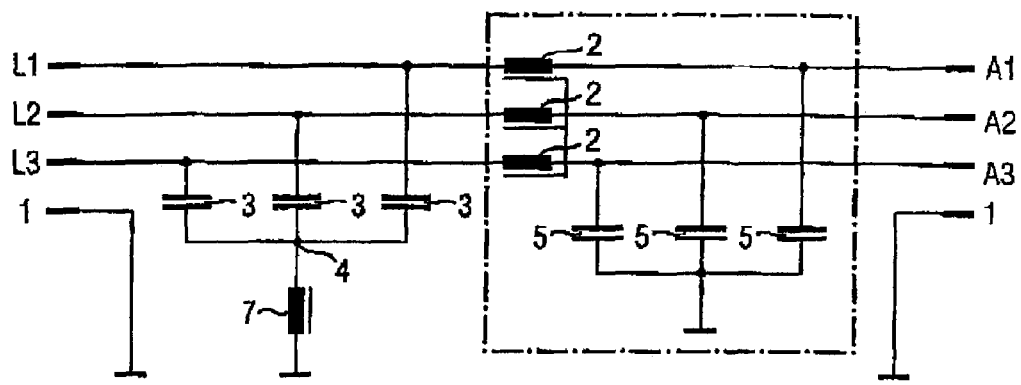
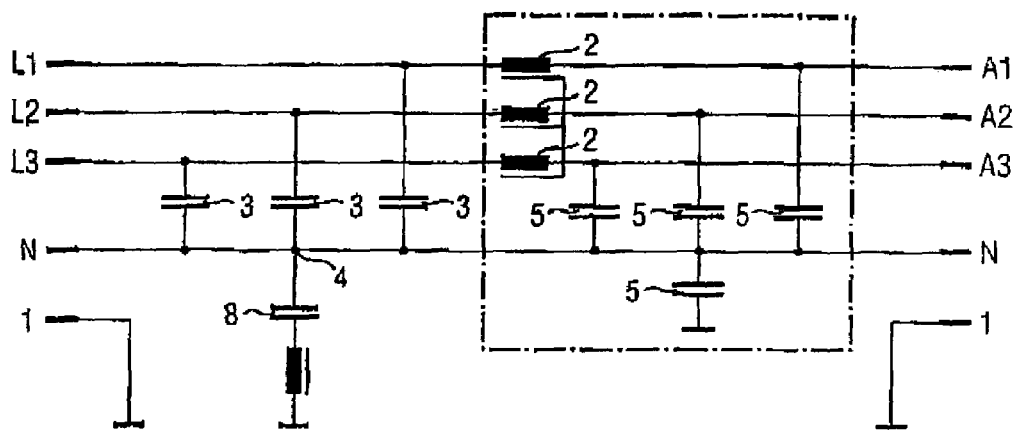

LINE FILTER

BACKGROUND OF THE INVENTION

1. Field of the Invention

The invention is directed to a network filter that comprises at least one filter inductance and at least one filter capacitor.

2. Description of the Related Art

Network filters of the species initially cited are known that comprise two through four phase inputs and a protective conductor or a filter housing in which each phase input is connected to the corresponding phase output via a filter inductance. Capacitors can be connected to each side of the filter inductances. These capacitors can be circuited to the protective conductor or to the filter housing either directly or via a star point that is connected to a further capacitor. The known network filters can be employed, for example, to screen a frequency converter connected to the network, i.e., to prevent the feed of high-frequency interference from the frequency converter into the power network. The network filter is connected between the power network and the frequency converter for this purpose In order to meet standards defined in conjunction with the frequency converter, for example the class A limit value according to EN 55011, the filter must exhibit certain minimum attenuation properties. With respect to this standard, a limit value of 79 dB μV is defined for line-bound interference in the range between 0.15 and 0.5 MHz and a limit value of 73 dB μV (quasi peak value) is defined between 0.5 and 30 MHz. In order to meet these specifications, it is necessary that the filter inductances employed in the known network filters exhibit a relatively high inductance.

In order to realize such filter inductances, "current-compensated" inductors with a ferrite core are usually employed, these being wound such that the magnetic flux induced in the ferrite core by the main current (push-pull) yields a sum of approximately zero. The inductor windings can be composed of one or more turns. Correspondingly many turns must be wound in order to achieve high inductance values.

This manufacturing method has the disadvantage that it is time-consuming and costly and that, in particular, it places narrow limits in view of the mechanical implementation (weight and size) of network filters.

The employment of filter inductances that comprise lower values and that could therefore be produced by simply slipping a ferrite core over a conductor is not possible given the previously mentioned network filters. When the filter inductances are too small, the attenuation properties of the network filter become poorer so that the network filter no longer meets the corresponding standards in conjunction with, for example, a frequency converter connected to it.

SUMMARY OF THE INVENTION

It is therefore an object of the present invention to provide a network filter that comprises good filter properties with low filter inductances.

This object is achieved by a network filter comprising: a protective conductor; at least one phase input, each of which is connected via a filter inductance to a corresponding phase output, an input side of each filter inductance being connected to the protective conductor via a filter capacitor, and an auxiliary inductance that is connected between each filter capacitor and the protective conductor. The invention may also comprise a common star point at which the filter capacitors are connected, the star point being connected to the protective conductor via an auxiliary inductance. Each filter capacitor may be connected to the protective conductor via an auxiliary inductance connected in series with it. The network filter may further comprise an auxiliary capacitor, via which the star point is serially connected to the auxiliary inductance. The network filter may further comprise at least one further filter inductance, each of which are connected in series with each filter inductance. The invention and advantageous developments are described more fully as follows.

The invention provides a network filter that comprises at least one phase input and a protective conductor. The protective conductor represents the high-frequency ground reference of the filter and can, for example, be produced by a filter housing. Each phase input is connected via a filter inductance to a corresponding phase output. At its input side, each filter inductance is connected via a filter capacitor to the protective conductor. Additionally, the network filter comprises at least one auxiliary inductance that is arranged such that an auxiliary inductance is circuited between each filter capacitor and the protective conductor.

The inventive network filter has the advantage that the asymmetrical screening effect of the filter is enhanced in the long-wave range (approximately 150 kHz) by the capacitors circuited to the protective conductor. Additionally, the auxiliary inductance effectively blocks higher-frequency ground currents (approximately 1 MHz) from skipping over onto the network input since the impedance of the auxiliary inductance increases with increasing frequency.

In an especially advantageous embodiment of the invention, the filter capacitors are connected to a common star point that is connected to the protective conductor via an auxiliary inductance. It is possible to connect the star point to the auxiliary inductance via an auxiliary capacitor connected in series, resulting in a further improvement in the filter properties.

The filter inductances can be reduced due to the improved network filter properties. A network filter is especially advantageous when the filter inductances are less than 50 μH. Such filter inductances can be produced with reduced outlay or even without outlay for winding a wire around a coil body.

Filter inductances <50 μH can be advantageously realized by a conductor that is surrounded by a magnetically conductive ring. Such filter inductances can be simply and inexpensively manufactured with little outlay and without winding a wire.

The magnetically conductive ring that surrounds the conductor for forming a filter inductance can, for example, be a ferrite core. Such ferrite cores are commercially obtainable, resulting in an even cheaper and less expensive manufacture of the filter inductances.

Values <50 μH can be employed for the auxiliary inductance. Such a small auxiliary inductance suffices for filtering out high-frequency interference since the A. C. resistance of an inductance increases proportionally with the frequency. Auxiliary inductances having these values are manufactured in a standard way as mass-produced goods and can therefore be very cost-beneficially acquired.

Furthermore, a network filter is especially advantageous when the filter capacitors and the auxiliary capacitor are between 1 nF and 10 μF. These typical values can be easily realized with commercially obtainable capacitors and are excellently suited for meeting the class A limit value according to EN 55011.

The inventive network filter can also be especially advantageously configured as a two-stage or multi-stage filter. To this end, one or more further filter inductances are connected in series with each filter inductance. Such a two-stage or multi-stage network filter exhibits even better filter properties compared to a single-stage filter.

DESCRIPTION OF THE DRAWINGS

The invention is explained in greater detail below on the basis of exemplary embodiments and the appertaining Figures.

FIG. 3 is a schematic diagram showing another inventive three-phase network filter without a neutral conductor by way of example;

FIG. 4 is a schematic diagram showing a three-phase network filter with a neutral conductor by way of example.

DETAILED DESCRIPTION OF THE INVENTION

Figure 1:
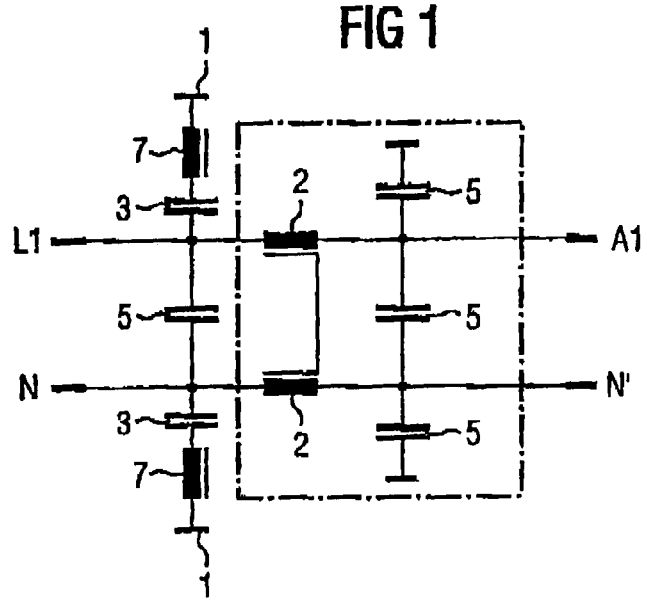
FIG. 1 is a schematic diagram showing an inventive, single-phase network filter by way of example.

FIG. 1 shows an inventive network filter with a phase input L1, a phase output A1, a neutral conductor input N and a neutral conductor output N'. Inputs and outputs are respectively connected to one another by a filter inductance 2. The inputs L1, N can be connected to a power network, whereas the outputs A1, N' can, for example, be connected to a frequency converter. The network filter also comprises a protective conductor 1.

Filter capacitors 3 that connect the filter inductances 2 to the protective conductor 1 are arranged at the input side of the filter inductances 2. An auxiliary inductance 7 is also respectively connected in series between the protective conductor 1 and the filter capacitors 2. Further capacitors 5 are circuited at the input side and output side of the filter inductances 2. The auxiliary inductance 7 prevents high-frequency interference occurring in the protective conductor 1 at the output side of the network filter from being supplied into the phase input L1 or into the neutral conductor input N and, thus, into the power network.

Figure 2:
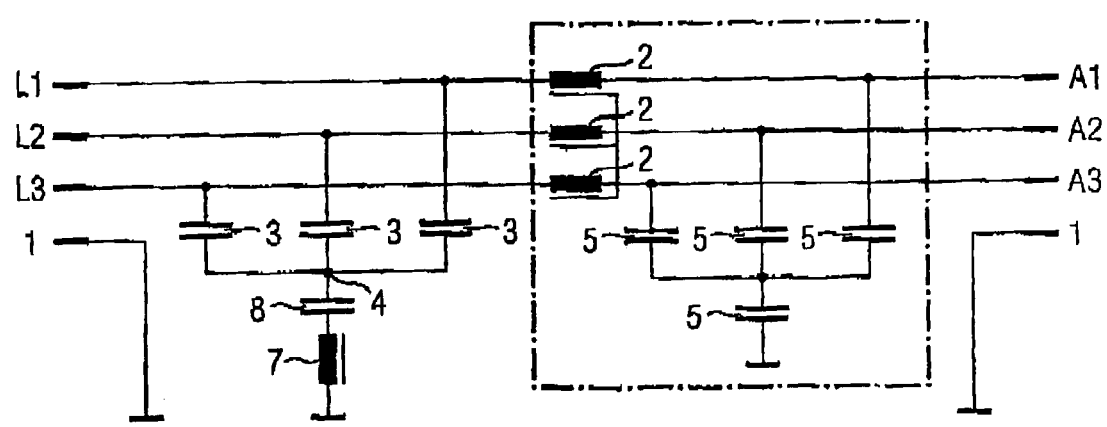
FIG. 2 is a schematic diagram showing an inventive three-phase network filter without a neutral conductor by way of example.

FIG. 2 shows an inventive network filter with three phase inputs L1, L2, L3 as well as three phase outputs A1, A2, A3. The filter also comprises a protective conductor 1. The filter capacitors 3 arranged at the input side of the filter inductance 2 are conducted to a common star point 4 of the input side. From there, they are connected to the protective conductor 1 via an auxiliary capacitor 8 and an auxiliary inductance 7 connected in series therewith. The auxiliary inductance 7 prevents high-frequency interference that occurs at the output side of the network filter in the protective conductor 1 from being supplied into the power network. The quality of the network filter is improved by the auxiliary capacitor 8, so that it manages with smaller filter inductances 2 given unaltered attenuation properties.

FIG. 3 shows a three-phase filter in which the filter capacitors 3 are connected directly to the auxiliary inductance 7 or the protective conductor 1 without a further auxiliary capacitor. The auxiliary inductor 7 prevents high-frequency interference that occurs at the output side of the network filter in the protective conductor 1 from being supplied into the power network.

FIG. 4 shows a three-phase network filter 1 in which the filter capacitors 3 arranged at the input side of the filter inductances 2 are circuited to a common star point 4 at the input side that is connected to the neutral conductor input N. The input-side star point 4 is connected to the protective conductor 1 via an auxiliary capacitor 8 and an auxiliary inductance 7 connected in series.

Figure 5:
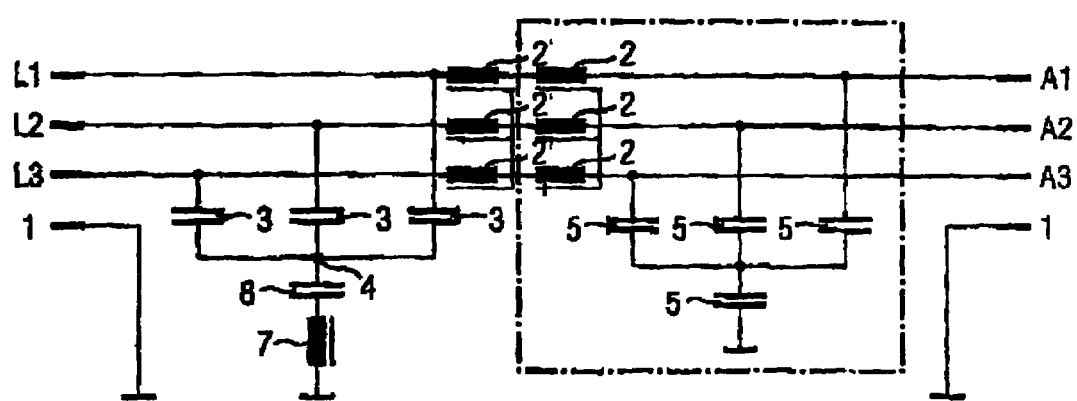
FIG. 5 is a schematic diagram showing an embodiment having further filter inductances.

FIG. 5 illustrates how the network filter may further comprise at least one further filter inductance 2', each of which are connected in series with each filter inductance 2.

The filters shown in the Figures are single-stage filters that can be easily expanded into multi-stage filters with improved filter properties by multiple series connection of the circuit part identified with the broken-line marking.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. For the sake of brevity, conventional electronics and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A network filter comprising:
    a protective conductor, which is directly grounded;
    at least one phase input, each of which is connected via an other filter comprising an inductance to a corresponding phase output, an input side of each inductance being connected at a side of the inductance which faces the phase input to the protective conductor via a capacitor,
    a common star point at which the filter capacitors are connected, the star point being connected to the protective conductor via an auxiliary inductance, said auxiliary inductance being connected between said common star point and the protective conductor; and
    an auxiliary capacitor, via which the star point is serially connected to the auxiliary inductance.

2. The network filter according to claim 1, wherein the filter inductances are less than 50 μH.

3. The network filter according to claim 1, further comprising:
    a magnetically conductive ring that surrounds a conductor that forms the filter inductances.

4. The network filter according to claim 1, further comprising:
    a ferrite ring that surrounds a conductor that forms the filter inductances.

5. The network filter according to claim 1, wherein the auxiliary inductance is less than 50 μH.

* * * * *